(12) United States Patent
Wilson, Jr. et al.

(10) Patent No.: US 8,528,875 B2
(45) Date of Patent: Sep. 10, 2013

(54) THREE-DIMENSIONAL TELESCOPING ADJUSTABLE EQUIPMENT MOUNTING FIXTURE

(76) Inventors: John Wilson, Jr., Mineola, NY (US); Richard C. Berger, Centerport, NY (US); John P. Giuliano, Ledgewood, NJ (US); Thomas C. Steele, Garden City, NY (US)

( * ) Notice: Subject to any disclaimer, the term of this patent is extended or adjusted under 35 U.S.C. 154(b) by 726 days.

(21) Appl. No.: 12/568,812

(22) Filed: Sep. 29, 2009

(65) Prior Publication Data

US 2011/0073017 A1 Mar. 31, 2011

(51) Int. Cl.
*F16M 13/00* (2006.01)

(52) U.S. Cl.
USPC ........... 248/561; 248/562; 248/637; 248/638; 248/346.01; 248/188.1; 52/167.8; 62/297

(58) Field of Classification Search
USPC ............ 248/237, 207, 676, 678, 638, 346.01, 248/560, 561, 562, 637, 188, 188.2, 188.8; 52/27, 57, 60, 167.1, 393, 200, 167.4, 167.7, 52/167.8; 62/297, 259.1, 263
See application file for complete search history.

(56) References Cited

U.S. PATENT DOCUMENTS

| | | | | |
|---|---|---|---|---|
| 3,878,655 | A * | 4/1975 | Toth et al. | 52/27 |
| 4,513,939 | A * | 4/1985 | Berger et al. | 248/544 |
| 4,598,503 | A * | 7/1986 | Berger et al. | 52/27 |
| 4,887,399 | A * | 12/1989 | Berger et al. | 52/27 |
| 4,917,345 | A * | 4/1990 | Czech | 248/678 |
| 5,791,092 | A * | 8/1998 | Strieter | 52/27 |
| 6,691,974 | B2 * | 2/2004 | Ku | 248/638 |
| 7,073,768 | B2 * | 7/2006 | Piscovich | 249/207 |
| 7,458,556 | B1 * | 12/2008 | Manucy | 248/676 |
| 7,757,441 | B1 * | 7/2010 | Whittaker | 52/167.4 |

* cited by examiner

*Primary Examiner* — Todd M. Epps
(74) *Attorney, Agent, or Firm* — Ladas & Parry LLP

(57) ABSTRACT

An adjustable equipment curb has upper and lower frames, each having opposed first and second length-adjustable sides and opposed length-adjustable first and second ends interconnectable to form a rigid frame and height-adjustable mounting legs. The lower frame may be used alone, or may support the upper frame through a shock mount system having mounts affixed to both the upper and lower frames and shock absorbing springs between the mounts. The frames may be formed of interconnecting channel members, and the lower frame channel members may be of a perforated construction that, in conjunction with applied sheathing, provides acoustic damping. Seismic brackets may be affixed to the either of the frames to provide resist seismic shock and developed moment resistance.

16 Claims, 16 Drawing Sheets

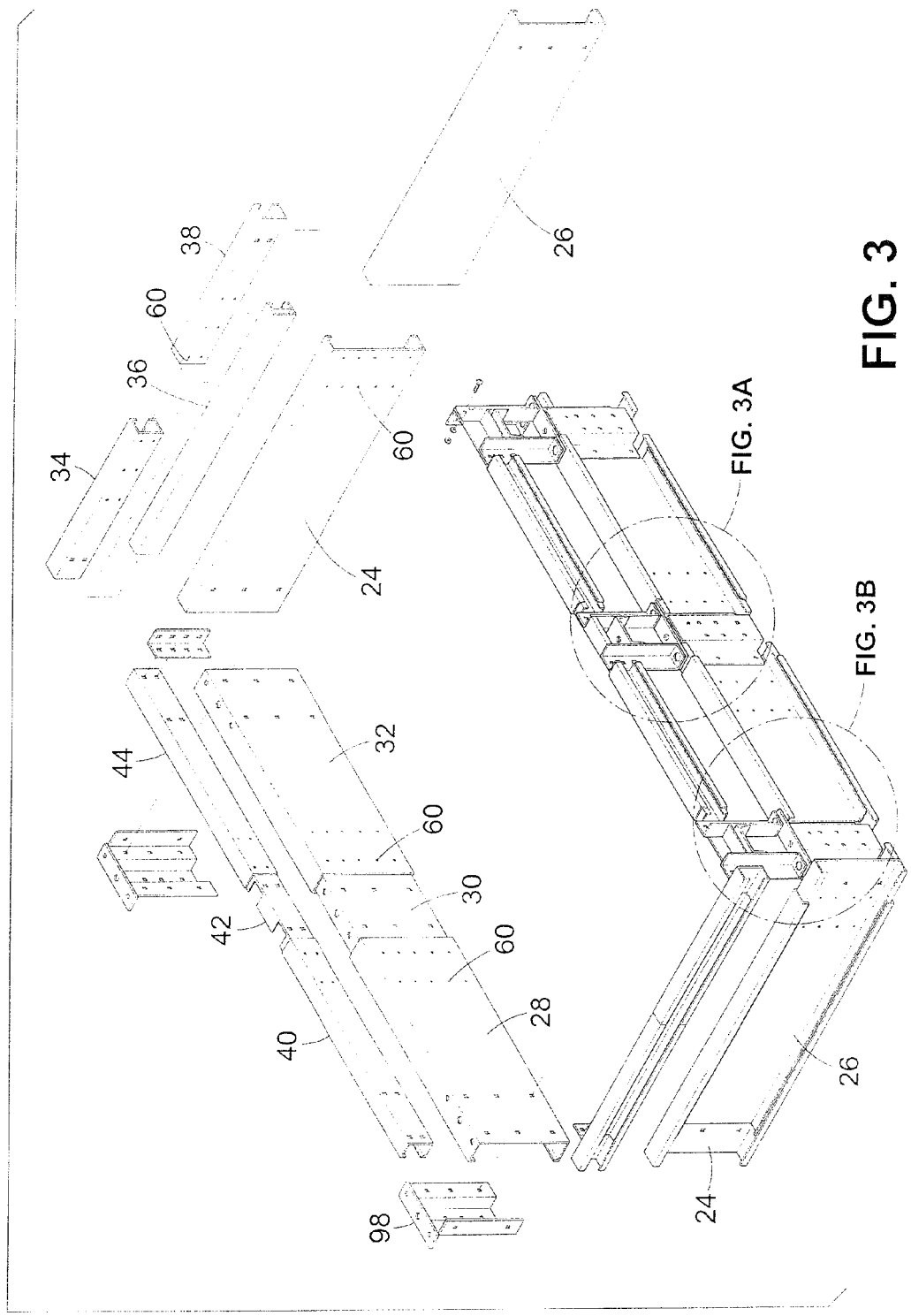

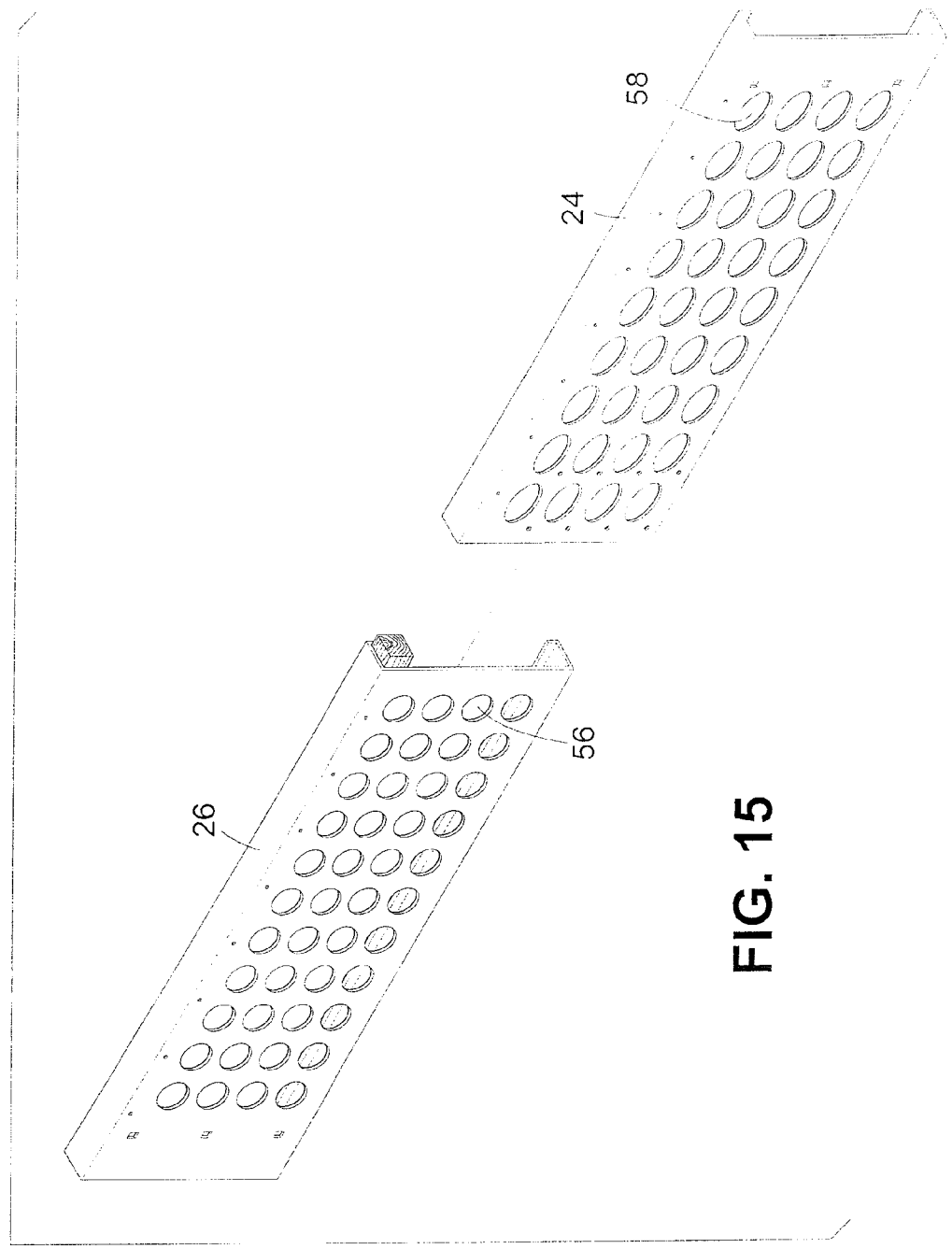

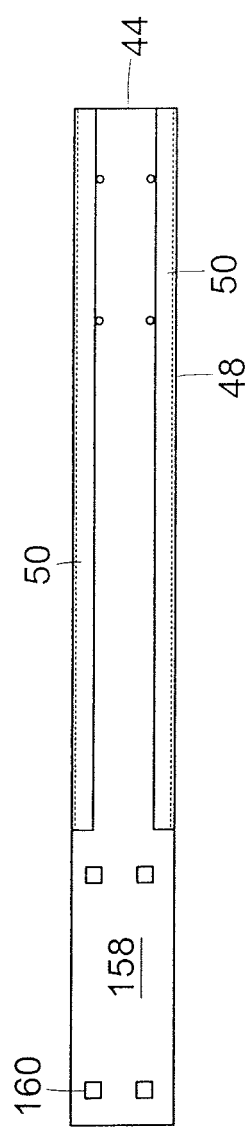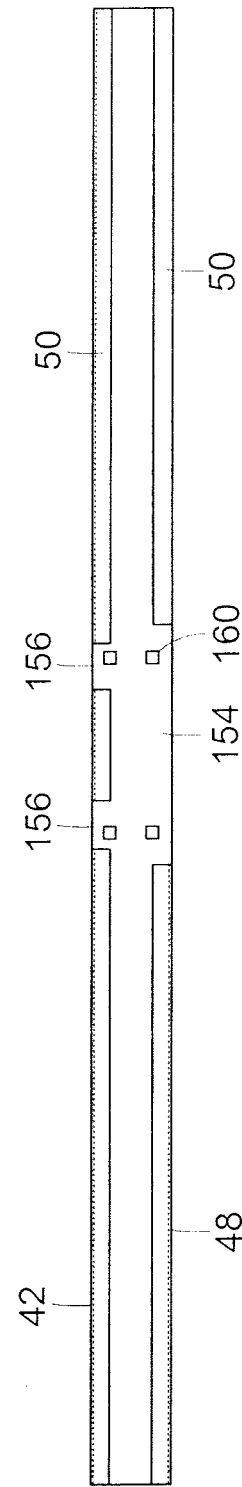

THREE-DIMENSIONAL TELESCOPING ADJUSTABLE EQUIPMENT MOUNTING FIXTURE

The present invention relates to a new and improved mounting fixture or curb for rooftop equipment and the like.

BACKGROUND OF THE INVENTION

Commercial and industrial heating, ventilating and air conditioning equipment is typically mounted on a roof or other exterior, generally horizontal surface associated with the facility whose air is to be treated by the equipment. Depending on the specifications and characteristics of the equipment, as well as its manufacturer and the location for the equipment, the size and footprint of the equipment is subject to significant variability, as is the mounting surface to which the equipment, through its mount, is attached. The equipment is not placed directly upon the roof or other surface, but is supported thereon by a framework or "curb". The curb is fastened to the roof and the equipment is then mounted to the curb. Conventional curbs, while supporting the equipment weight, typically are incapable of isolating vibration or noise, or withstanding seismic forces or wind loads.

Because of the variability in equipment footprint, the curb utilized to mount a specific piece of equipment must be matched to the equipment's footprint size. Proper matching either requires a plurality of differently sized curbs to be inventoried, or requires custom manufacture of the curb, either at a manufacturing plant or at the installation site, to accommodate the specific equipment being mounted. Neither alternative is efficient or cost effective.

It is accordingly a purpose of the present invention to provide one equipment curb able to conform to a variety of equipment footprints, thus permitting standardization of curb construction while providing significantly adaptability.

A further purpose of the present invention is to provide a universal equipment curb capable of being independently adjustable in a plurality of dimensions or directions to accommodate equipment of varying sizes and varying slopes of the surface to which the curb is mounted.

A further purpose of the present invention is to provide an adjustable curb of economical construction and great adaptability, while affording a rigid mounting system capable of supporting the equipment and having provision for vibration and noise isolation, seismic force sustainability, and wind load resistance.

BRIEF DESCRIPTION OF THE INVENTION

In accordance with the foregoing and other objects and purposes, an equipment curb in accordance with the present invention comprises lower and upper assemblies forming a pair of closed frames typically surrounding one or more apertures in the roof or other surface to which the curb is mounted and above which the equipment, supported by the curb, is positioned. Each of the frames has opposed side and end sections, each of which in turn consist of a plurality of telescoping, inter-engaging panels that allow the overall length of the sides and ends to be individually adjusted to the requirements of a specific installation. The panels are preferably constructed as channel members, configured and dimensioned to interlock to provide adjustability and rigidity with a high degree of precision. The panels may preferably be of a construction to provide noise attenuation and thermal protection.

The upper frame is mounted to the lower frame by a mounting system that provides a solid but resilient connection having spring members to provide isolation of the equipment mounted upon the upper frame from the structure to which the lower frame is mounted. If such isolation is not desired the upper frame is not used, and the equipment is mounted directly to the lower frame.

The lower frame is provided with support members that are independently adjustable, allowing the lower frame to be leveled, irrespective of the contour or pitch of the roof or structure to which the curb is mounted. The lower frame may also be adapted to accommodate nailers that in turn serve as connection points for flashing and like elements to provide a weatherproof seal between the curb and mounting surface.

Both the upper and lower frames accept seismic brackets that provide a rigid connection with the mounted equipment, allowing the mounted equipment to resist seismic shock and particularly developed moments that conventional mountings that rely upon overhang at the equipment over an upper support ledge of the curb are incapable of withstanding.

BRIEF DESCRIPTION OF THE DRAWINGS

A fuller understanding of the present invention will be obtained upon consideration of the following detailed description of a preferred but nonetheless illustrative embodiment of the invention, when reviewed in conjunction with the annexed drawings wherein:

FIG. 3 is an exploded perspective view of a curb of the present invention;

FIG. 15. is a perspective view of a pair of typical frame panels illustrating a construction for noise attenuation;

FIG. 19 is an elevation view of an upper frame side end panel; and

FIG. 20 is an elevation view of an upper frame side central panel.

DETAILED DESCRIPTION OF THE INVENTION

Figure 1:
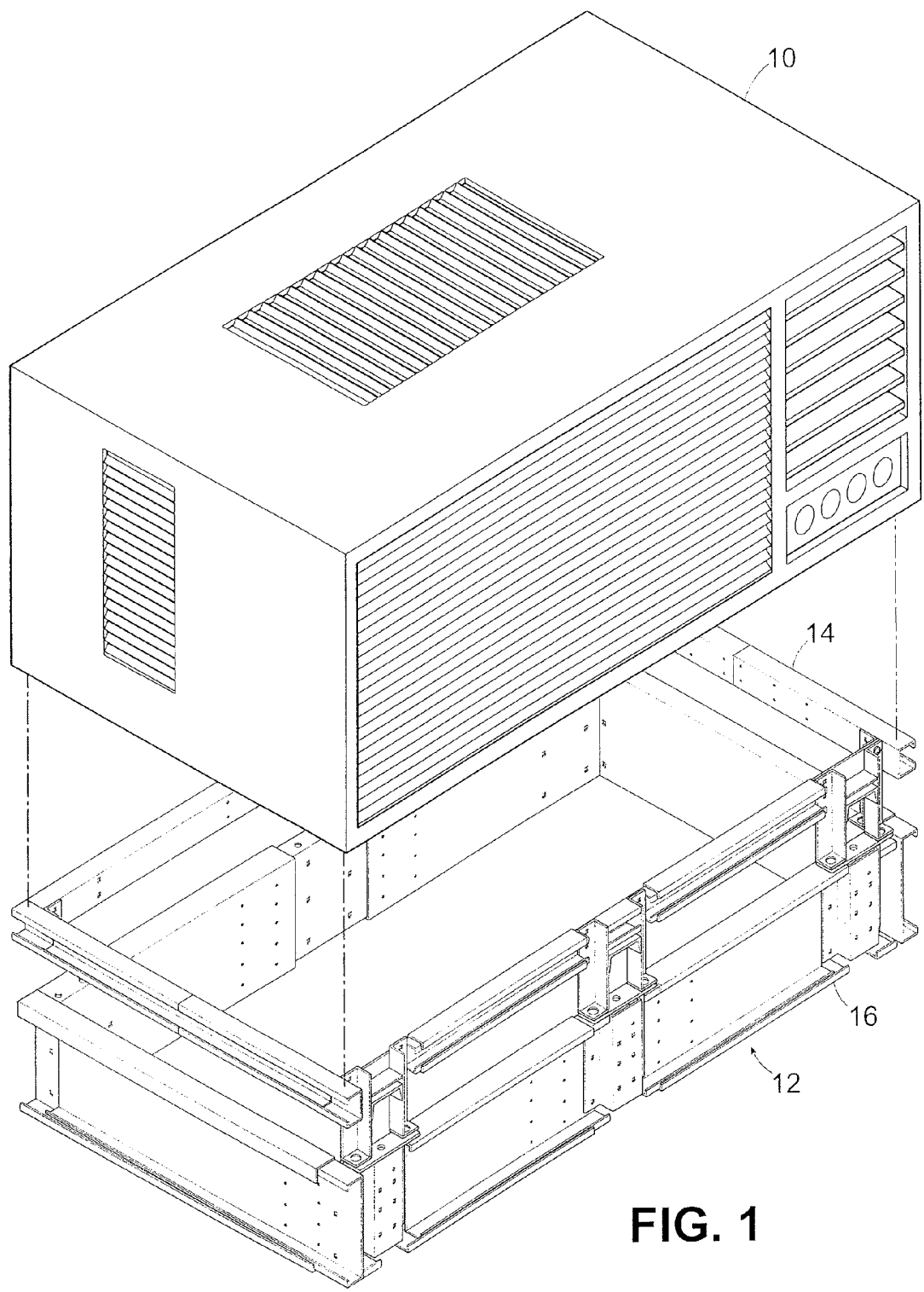
FIG. 1 is a perspective view of a curb of the present invention with a typical air conditioning unit positioned for installation thereon.
Figure 2:
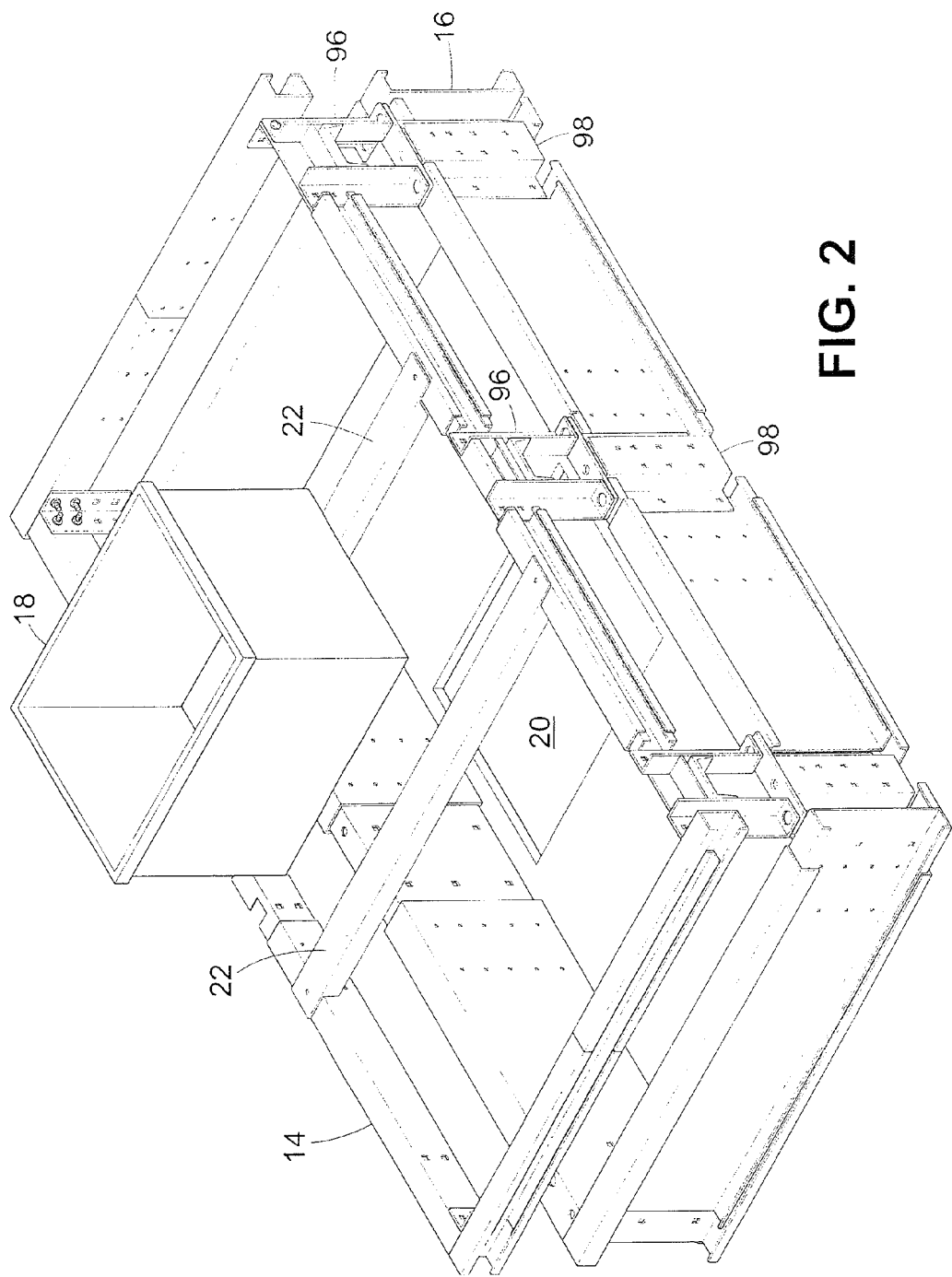
FIG. 2 is a perspective view of a curb of the invention and a typical plenum or duct associated with air conditioning equipment positioned for mounting in conjunction therewith.

With initial reference to FIGS. 1 and 2, conventional heating, ventilating and air conditioning equipment, such as industrial air conditioning unit 10, is supported by curb 12 of the present invention. Curb 12 has an upper frame 14 upon which the air conditioning unit is mounted, and a lower frame 16, which is mounted to the roof or other supporting surface. Alternatively, lower frame 16 can be utilized without upper frame 14, to directly support the mounted equipment. Both the length and width of upper frame 14 and lower frame 16 are adjustable to allow the dimensions of curb 12 to conform to those of air conditioning unit 10.

Air conditioning unit 10 may be associated with one or more ducts or plenums 18 that typically extend downwardly from the bottom of the air conditioning unit through conforming mounting surface openings, such as roof opening 20, to conduct treated and return air to and from the air conditioning unit. Analogous ducts may also be provided for wiring and the like. To support the ducts and maintain them in position, pairs of telescoping supports 22 extend between opposed sides or ends of upper frame 14 upon which the equipment is mounted and provide a mounting surface for flanges of the ducts. When the upper frame is not utilized, the supports may be affixed to the lower frame. The supports 22 are positioned and arranged as appropriate and required to support the plenums/ducts. A flashing system, as known in the art, can be affixed to the exterior sides of the curb unit through nailers (see, e.g. FIG. 5) to seal the curb unit and its interior space from the elements.

With reference to FIG. 3, each of upper and lower frames 14, 16 are composed of a plurality of mating panels that telescope and collapse to allow the frames to be size-adjustable. Lower frame 16 firstly includes opposed pairs of interengaged end panels 24, 26. Lower frame 16 also includes three telescoping side panels 28, 30, 32 that together form each of the lower frame's opposed right and left sides. FIG. 3 depicts both end panels 24 and 26 fully separated (at the depicted right end of the curb) as well as a pair of end panels 24 and 26 mated and adjusted to a desired overall width dimension (as seen at the left end of the Figure). FIG. 3 further depicts a first set of side panels 28, 30, 32, interfit prior to final adjustment (as depicted in the far side of the curb) as well as in a correctly-sized orientation engaged with other elements at the near side of the curb.

Upper frame 14 is of a similar construction, with both upper frame ends and sides being formed of three panels. End panels 34, 36, and 38 telescope and interfit to allow adjustment to the needed width, and telescoping side panels 40, 42, and 44 interfit to allow adjustment to the needed length.

Figure 5:
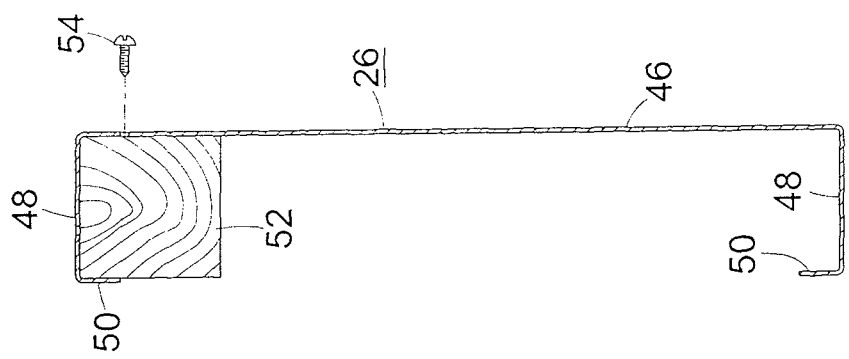
FIG. 5 is an illustrative section of a lower frame panel with a nailer positioned thereon.

As shown in FIG. 5, each of the end and side panels for both the lower and upper frames, such as end panel 26 as depicted, is generally C-shaped in section, with a vertical wall portion 46 bounded by upper and lower horizontal walls 48. A pair of short vertical return walls 50 extend inwardly toward each other and, for an overlying panel, provide for capture of an inner mating telescoping panel element. Lower frame side panels 28, 32 are of identical cross-sectional dimensions, with central side frame panel 30 dimensioned to fit snugly therein. Similarly, upper frame side panels 40 and 44 are of identical cross-sectional dimensions, with central side panel 42 dimensioned to fit therein. Lower frame end panels 24 and 26 are of differing cross-sectional dimensions, chosen to provide the needed interfit, while the upper frame end panels, like the upper frame side panel assemblies, have outer panels 34, 38 of the same cross sectional dimensions, with central panel 36 being sized to fit within the outer panels.

All the panels may be formed, for example, of 16-gauge aluminum. The panels forming the lower frame may be approximately 11 inches in height, with the end panels 24, 26 each being approximately 36 inches long. The lower frame side panels 28, 32 may be on the order of 28 inches in length, with the center panel 30 having a length of 51 inches. The lengths of the corresponding upper frame side panels 40, 42, 44 are the same as the lower frame side panels, with the height of the upper frame panel elements being approximately 3 inches. The upper frame end panels 34, 38 may be on the order of 20 inches long, with the central panel 36 having a length of 33 inches. Panels of such dimensions can be readily assembled into curbs between 66 and 96 inches long and between 40 and 61 inches wide.

As depicted in FIG. 15, each of the panels for the lower frame may preferably be constructed with perforated vertical wall portions. The perforations extend over the major area of the portions. The perforations or apertures 56 in the first of an interengaged pair of panels, such as a lower end panel 26, are circular, while the perforations 58 in the second of the interengaged pair, such as a lower end panel 24, are elliptical. The size and spacing of the perforations are chosen such that they align when the panels are interfit and provide an open area at approximately 25 percent of the total exposed surface area of the panels. The elliptical shapes of one of the sets of apertures, with the major axis of the ellipse extending horizontally, allows the extent of open area to be substantially maintained when the panels are adjusted laterally to conform to the size of the mounted equipment.

The perforated panels, in combination with the overlying sheathing or shielding extrusions that are conventionally mounted to nailer strips 52 of curbs to provide a weatherproof seal between the curb and the structure to which the curb is mounted, form an acoustic damping system for noise generated or transmitted from within the curb. The perforations allow the noise energy to pass through the curb walls to be damped and absorbed by the sheathing, rather than being reflected and absorbed by rigid solid walls in a manner that would contribute to the transmission of the noise and vibration into the supporting structure.

Figure 3A:
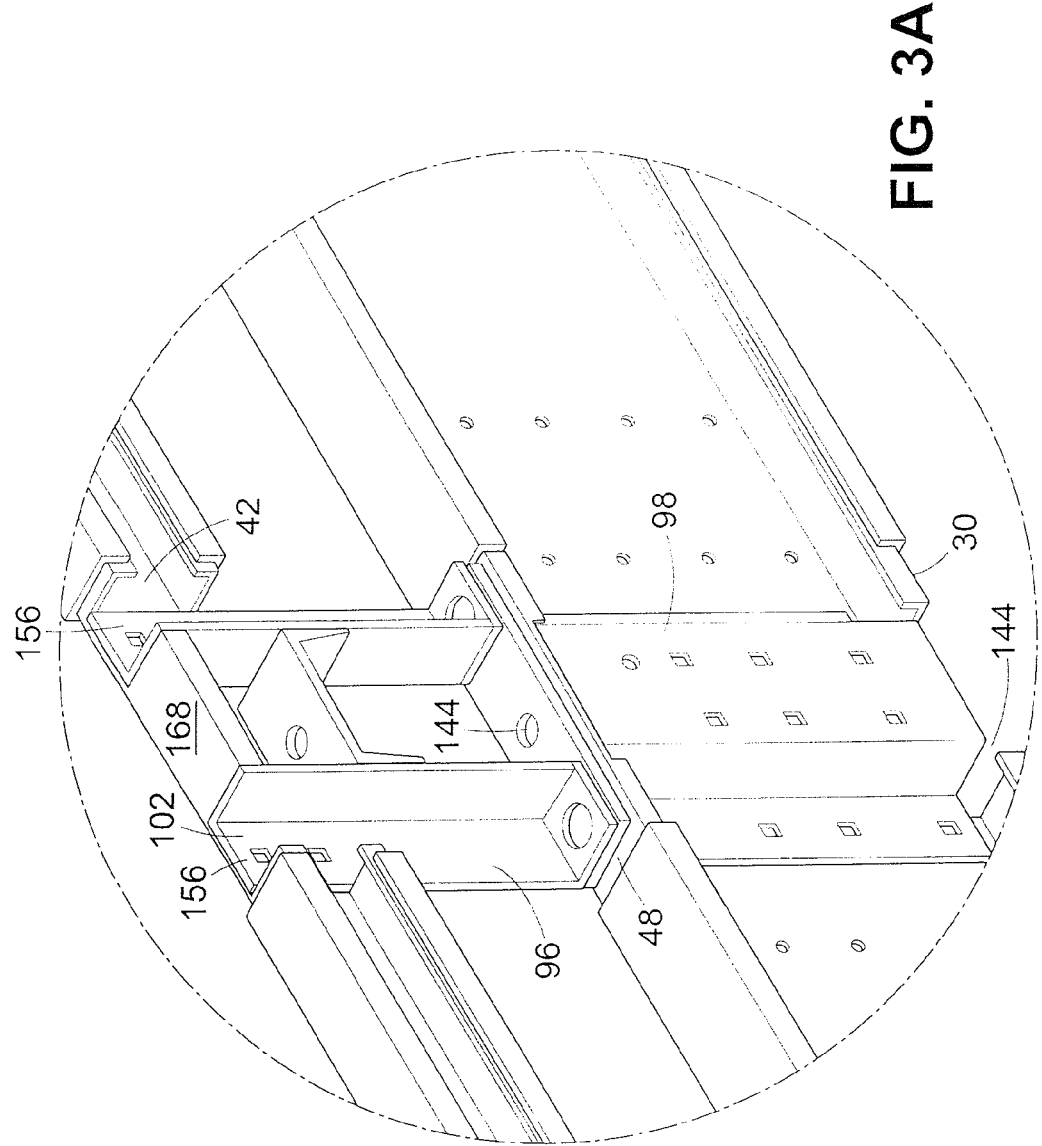
FIG. 3A is a detail view of a central section of a side of the curb.
Figure 3B:
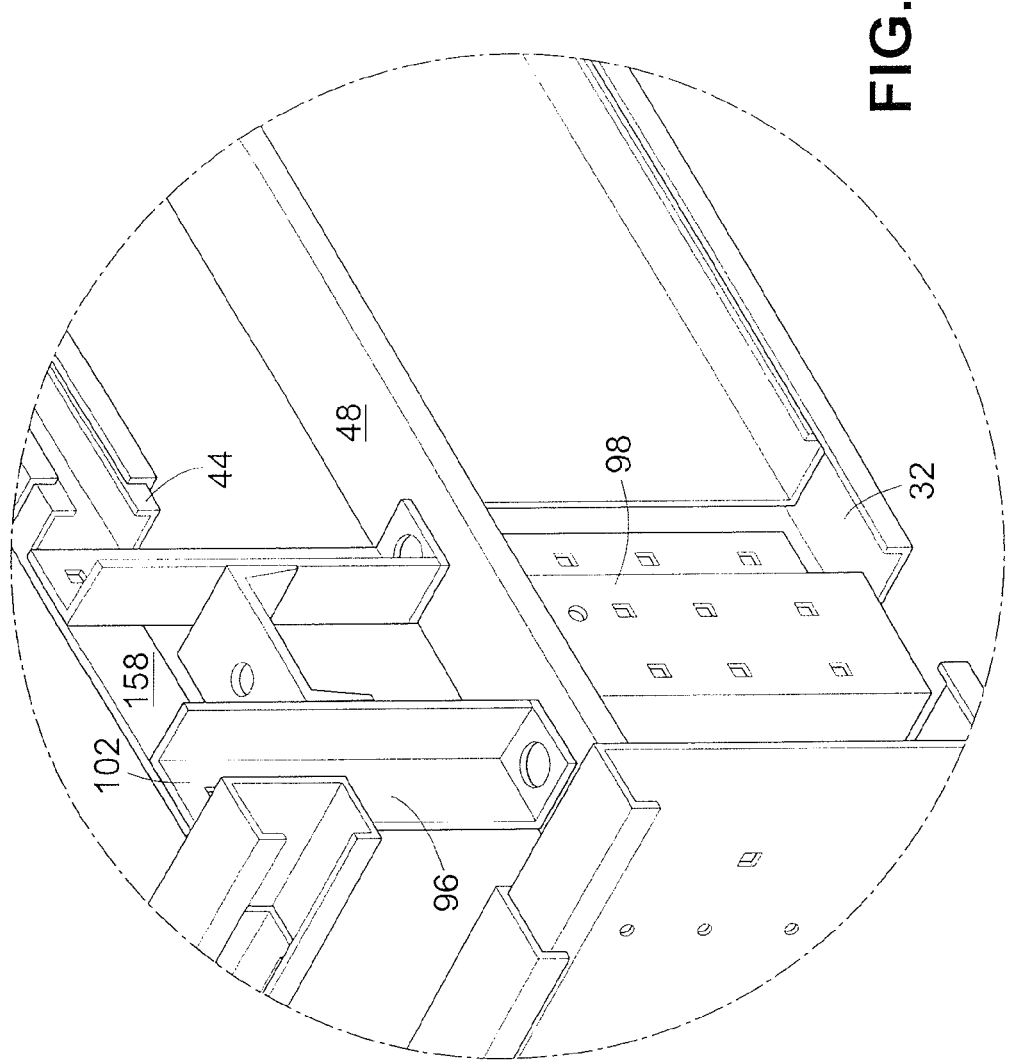
FIG. 3B is a detail view of a corner of the curb.
Figure 4:
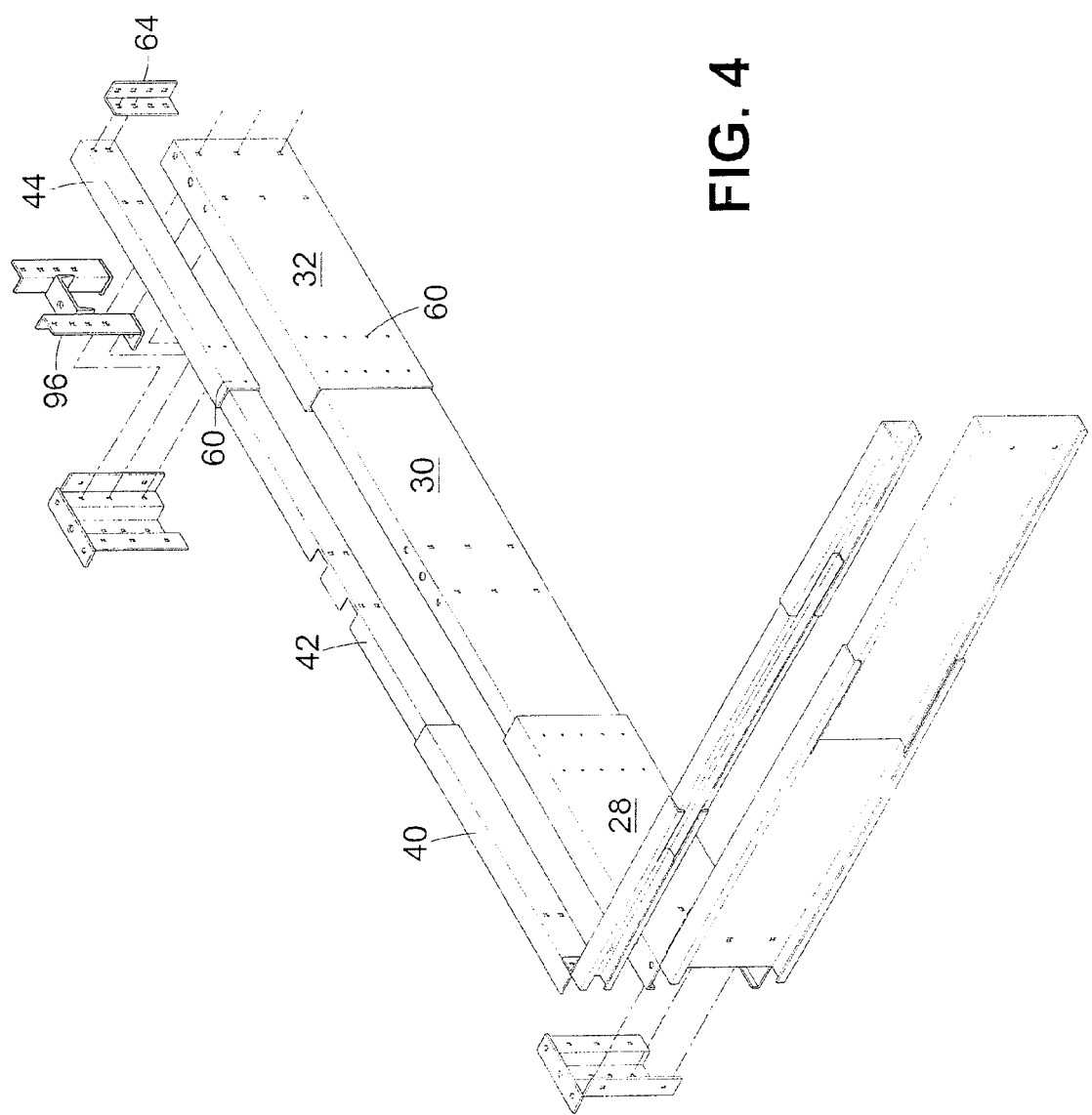
FIG. 4 is a perspective view of an illustrative corner section of a curb adjusted to a requisite size.

With further reference to FIGS. 3 and 4, the end and side panels may be provided with a series of bores, such as bores 60 in lower panels 24, 28 or 32 or upper panels 40, 44, 34 or 38 to facilitate the fastening of the individual end and side panels together when the assembled sides and ends of the curb are adjusted to the appropriate size. It is to be noted that the frame side panels 28, 32 and 40, 44, as well as frame end panels 34 and 38, are mirror images of each other, allowing the same panels to be used on opposite sides of a curb. The lower frame end panels 24, 26 may also, but need not, be mirror imaged. A workman, using a series of the bores 60 as guides, drills holes through the corresponding mated panel element and fastens the panel elements together with nuts and bolts or other connectors as appropriate. Sets of bores may be provided at a variety of locations along the panels to further facilitate inter-attachment of the panels over a broad range of desired curb lengths and widths. Both panels of mating panel pairs may be provided with pre-drilled bores at locations corresponding to commonly experienced overall dimensions, to avoid the necessity for any drilling in such circumstances.

As further depicted in FIG. 4, the end and side panel assemblies of both the lower and upper frames are joined to each other at their respective ends by corner brackets 62 and housing brackets 98, respectively. Each of the brackets is of a right angle construction and may be formed of 0.125-inch thick stock. Housing brackets 98 are discussed more fully infra. The brackets 64 are of a length sufficient to connect the sides and ends of the upper frame through both the adjacent frame panels as well as through the interconnection between upper housings 96 (to be discussed infra) positioned at the corners of the upper frame. The ends of the end panels overlap the ends of the respective adjacent side panels to provide a more robust interconnection. Both the corner brackets and the ends of the panels to be joined may be provided with aligned bores to allow the brackets to be attached to the panels by nut and bolt systems. With the individual panel elements forming each side and end joined together, and the corresponding side and end constructions fastened together, a customized rigid curb is formed.

Figure 6:
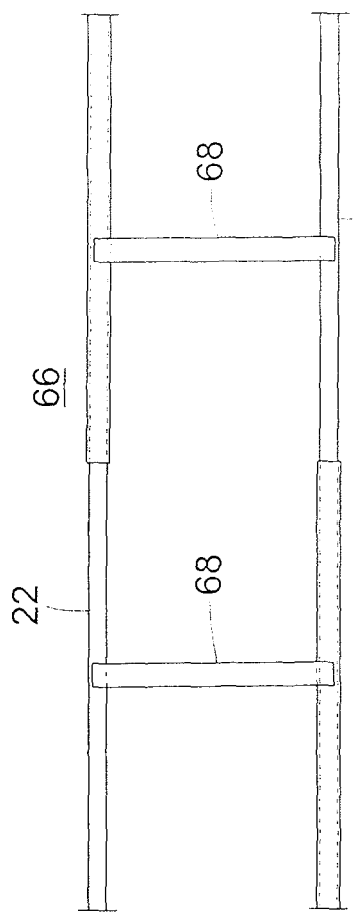
FIG. 6 is a top plan view of an interior plenum support frame for mounting between opposed sides or ends of an installed curb.
Figure 7:
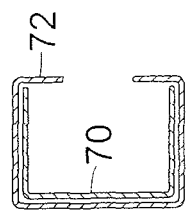
FIG. 7 is a representative cross-section view of a frame unit of FIG. 6 depicting the nesting of elements thereof.
Figure 8:
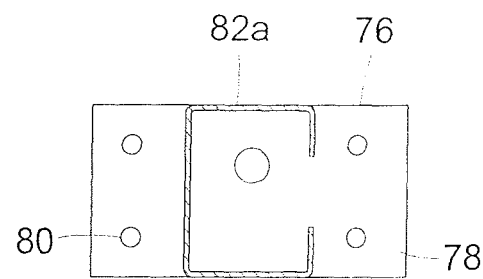
FIGS. 8 and 9 are elevation views of brackets for mounting the plenum support frame to the curb frame.
Figure 9:
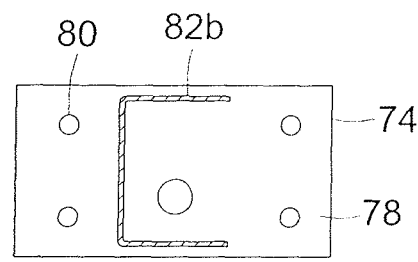

The telescoping plenum/duct supports 22 are of a similar construction to that of the side and end panels. As depicted in FIGS. 6 and 7, a duct support assembly 66 comprises a pair of telescoping supports 22 joined by cross members 68. As detailed in FIG. 7, each of the support members 22 comprises inner and outer telescoping sections 70, 72. Inner section 70 is C-shaped in cross-section, while the outer section 72 is of similar C-shape cross-section with inwardly-directed vertical return portions in a manner analogous to the construction of the side and end panel elements. The distal ends of the telescoping support sections are mounted to a curb frame by use of brackets as depicted in FIGS. 8 and 9. As depicted therein, end brackets 74, 76 each have a plate 78 which is mounted at the appropriate place to the inwardly-directed vertical face of a frame panel, such as an upper frame panel 40 or 44. Mounting bores 80 may be provided for mounting bolts. Mounted to the plate 78, such as by welding or like, is connector element 82a or b. Connector element 82b accepts an outer telescoping section 72, and thus is configured identically in cross-section to an inner telescoping section 70, while the connector element 82a for engagement with an inner telescoping section 70 is likewise configured identically in cross-section to that of an outer section 72. Each telescoping support 22 is expanded to the necessary length, its respective ends being captured by a pair of aligned brackets 74, 76. The outer telescoping section 72 may be provided with a series of bores along a portion of its length, allowing one or more corresponding aligned bores to be drilled in the inner section and fasteners, such as screws, to be inserted therethrough to join the inner and outer sections together and maintain the desired length. Bores at the distal ends of the telescoping sections and corresponding bores in the connector elements of the brackets 74 may also be provided to firmly affix the elements 22 thereto.

Figure 10:
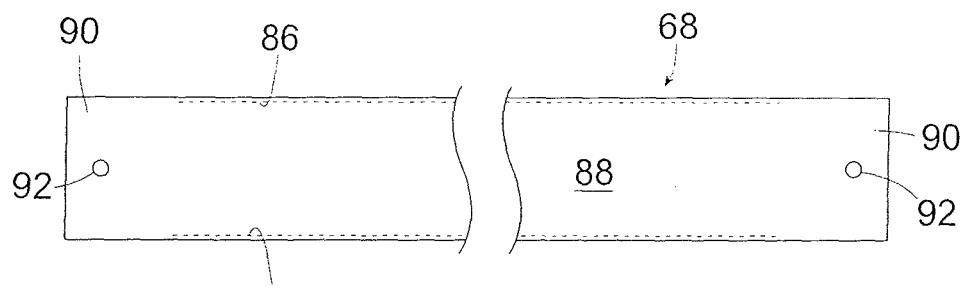
FIG. 10 is a plan view of a plenum support cross member.

FIG. 10 further illustrates the construction of the cross members 68. As shown in plan view, the cross members are of generally U-shaped construction, with a pair of downwardly-extending side walls 86 joined by center section 88. The center section 88 extends distally beyond the ends of the side walls, providing a pair of flat panel mounting portions 90 which rest upon the top surfaces of the telescoping supports 22 joined thereby. The cross members 68 are fastened to the telescoping supports by screws inserted through bores 92 into corresponding bores drilled through the top surfaces of the telescoping supports 22.

Figure 11:
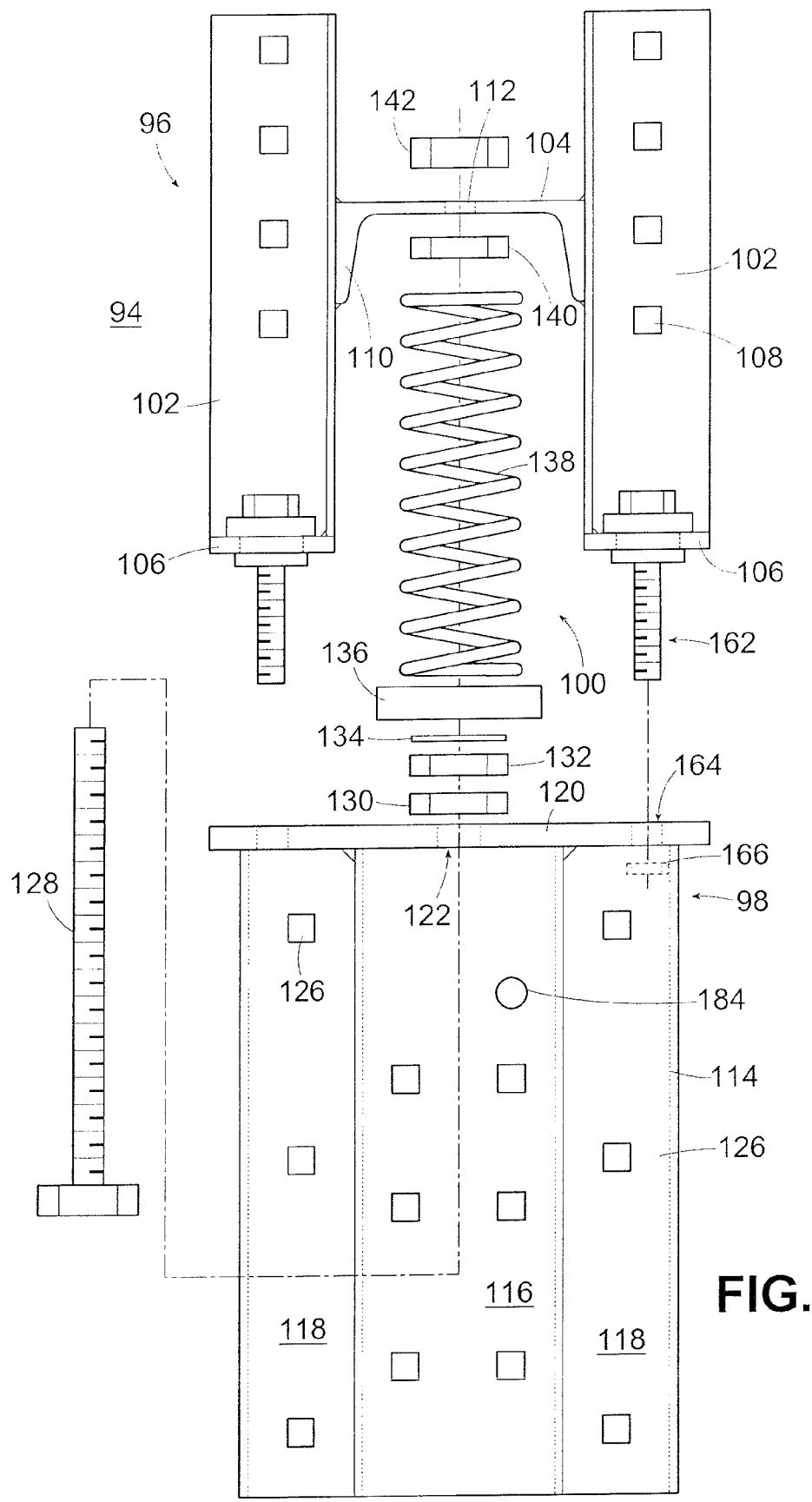
FIG. 11 is an exploded view of a mount for supporting the upper curb frame upon the lower frame.
Figure 12:
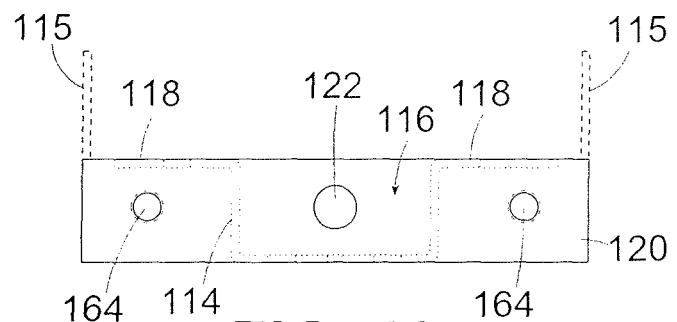
FIG. 12 is a top plan view of a lower housing of the mount of FIG. 11.
Figure 13:
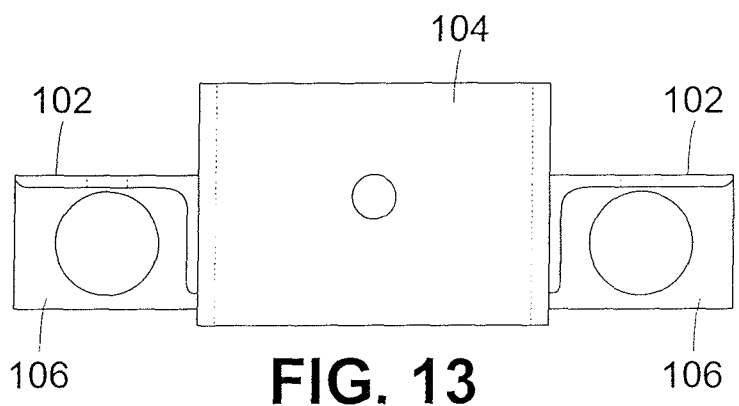
FIG. 13 is a top plan view of the upper housing of the mount.

When a curb incorporates both lower and upper frames, upper frame 14 is mounted to lower frame 16 by a series of mount assemblies 94, depicted in FIGS. 11-13, which provide a strong but resilient connection to provide vibration isolation between the installed equipment and the structure upon which the curb is mounted. Each of the mount assemblies includes an upper housing 96 mounted to upper frame 14 and a lower housing 98 mounted to lower frame 16. Spring system 100 extends therebetween. The lower housings also serve to join the corners of the lower frame, irrespective of whether an upper frame is also to be employed, and thus are located at such corners.

Upper housing 96 is in the general form of an "H" in elevation, with vertical legs 102 supporting a transverse horizontal plate 104. The legs 102 may be constructed of angle stock with bottom plates 106 and have square holes 108 for mounting purposes. The bottom plates 106 have mounting bores through which nut and bolt assemblies 162 are mounted and extend. The bolts extend through receiving bores 164 in the lower housing 100. A lower nut 166 (shown in phantom) allows the maximum relative vertical displacement between the frames to be designated. Horizontal plate 104 may include mounting flanges 110 and a central bore 112 to accept the spring assembly.

Lower housing 98 includes a formed main vertical section 114 having a vertically-extending U-shaped central portion 116 with a pair of opposed mounting wings 118. The main section supports top plate 120, having a central bore 122 to which the spring system is mounted and the receiving bores 164 for the bolts of 162. Square mounting bores 126 are also provided in the vertical sections 114. As depicted in phantom in FIGS. 11 and 12, either mounting wing 118 may have a rearwardly-extending right angle panel 115 with bores positioned to align with the bores at the end of lower end panels 24, 26. Depending on the mounting wing 118 from which the panel 115 extends, the lower housing is used to interconnect a side panel to an end panel at either a right or left end of the curb.

Spring system 100 includes main support bolt 128 which extends upwardly through bore 122 in the lower housing 98 to support the spring elements and thereafter through central bore 112 in upper housing 96. Bolt 128 is firmly mounted to the lower housing by a nut 130. Spring adjustment nut 132 supports washer 134 and spring cup 136. Main spring 138 lies between spring cup 136 at its lower end and rubber bumper washer 140 at its upper end. Upper nut 142 retains the bolt and spring to the upper housing. The effective extended length of spring 138 is controlled by the position of adjustment nut 132 on the bolt. The characteristics of spring 138 are chosen as known in the art in consideration of the load of upper frame 14 and the attached equipment 10 and the expected vibrational and other forces sought to be damped. Preloading of spring 138 as may be required can be affected by adjustment of adjustment nut 132. The spring system is normally assembled after the upper and lower housings are respectively mounted to the upper and lower curb frames.

The mount assemblies 94 are mounted to the curb along its opposed sides, as shown in FIGS. 2 and 3. Three assemblies may be located on each side of the curb. FIGS. 17-20 illustrate the construction of the curb panels to accommodate the mount assemblies. With reference to FIG. 18, illustrative lower central panel 30 is provided with notches 144 in both lower return wall 50 and lower horizontal wall 48 to accommodate U-shaped central portion of lower housing 98. A corresponding portion 144' of the upper return wall 50 is removed, the upper horizontal wall 48 being provided with bores 146 to align with the bores 164 in top plate 120 and with bore 148 for spring bolt 128. Square bores 150 in vertical wall section 46 align with housing bores 126.

Figure 17:
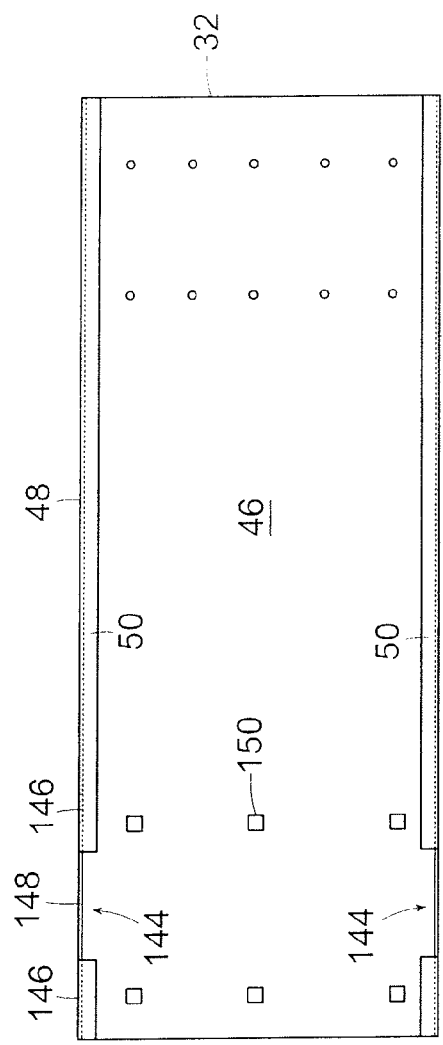
FIG. 17 is an elevation view of a lower frame side end panel.
Figure 18:
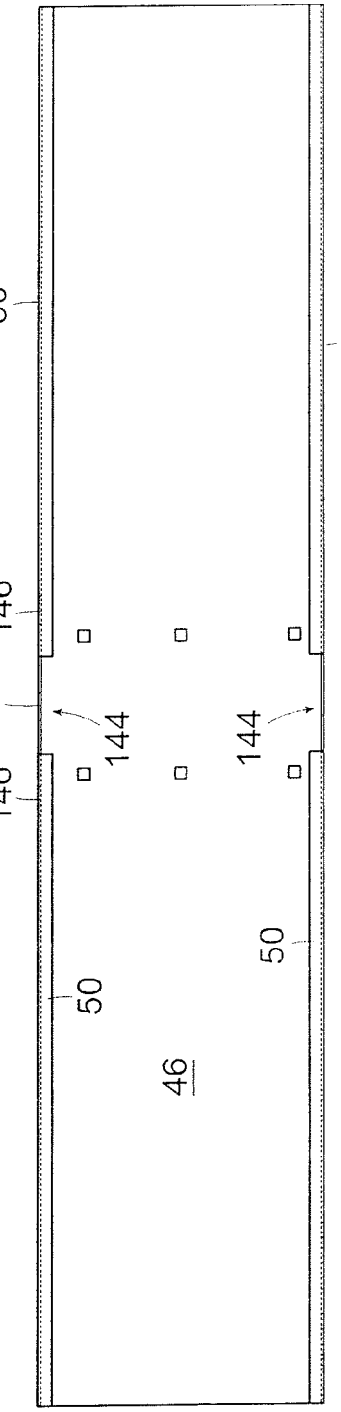
FIG. 18 is an elevation view of a lower frame side central panel.

The lower side end panels, such as panel 32 in FIG. 17, similarly have a notch 144 in both the lower return wall 50 and lower horizontal wall 48, a corresponding portion 144' of the upper return wall removed, bores 146, 148 in its upper horizontal wall 48, and square bores 150 in its vertical wall section 46.

In a similar manner, the upper central panels, such as panel 42 depicted in FIG. 20, have a central notch 154 in the lower horizontal wall 48 and return wall 50, sized and spaced to accommodate the upper housing 96, and a pair of notches 156 in the upper return wall 50 to accommodate the forwardly-extending portion of the upper housing's legs 102, which are further accommodated behind the adjacent portions of the upper return wall. The upper end panels, such as panel 44 depicted in FIG. 19, has the distal portion of the lower horizontal wall 48 and return wall 50 removed along with the distal portion of the upper wall 50, presenting a planar portion 158 for receipt of an upper housing. Square mounting bores 160 are provided in both the central and end panels to accept mounting bolts for the housing.

Shown at the upper left side in FIG. 3 is the orientation of an exemplary lower housing 98 positioned for attachment to an end of panel 28. The square shape of the mounting bores in the panel and housing accommodates bolts with square cross-section shank portions to prevent the bolts from rotating as a corresponding washer and nut are tightened down thereon. As it is contemplated that the provided lengths of side panels 28 and 32 are such that a central portion of central side panel 30 remains exposed, a central mounting location in the side panel 30 for a lower housing 98 is also always available.

Further details of the mounting of the mount assemblies are seen in FIGS. 3A and 3B. FIG. 3A depicts the positioning of a mount assembly to the middle side panels 30 and 42, while FIG. 3B depicts the positioning of a mount assembly to outboard side panels 32 and 44.

As shown in FIG. 3A, the upper mount housing 96 sits against the vertical wall of side panel 42, the legs 102 fitting into the upper slots 156 between intermediate ledge portion 168, the upper housing extending down below the upper frame. The lower mount housing 98 rests against the vertical wall of lower middle side panel 30, aligned with notch 144, the upper end of the housing falling under the upper horizontal wall 48.

FIG. 3B further illustrates the construction of the end side panels to accommodate the upper and lower housings. The upper housing 96 rests against the planar end portion 158 of panel 44. The lower housing 98 rests against the vertical wall of lower side end panel 32, the upper end of the housing likewise falling under the upper horizontal wall 48.

Figure 14:
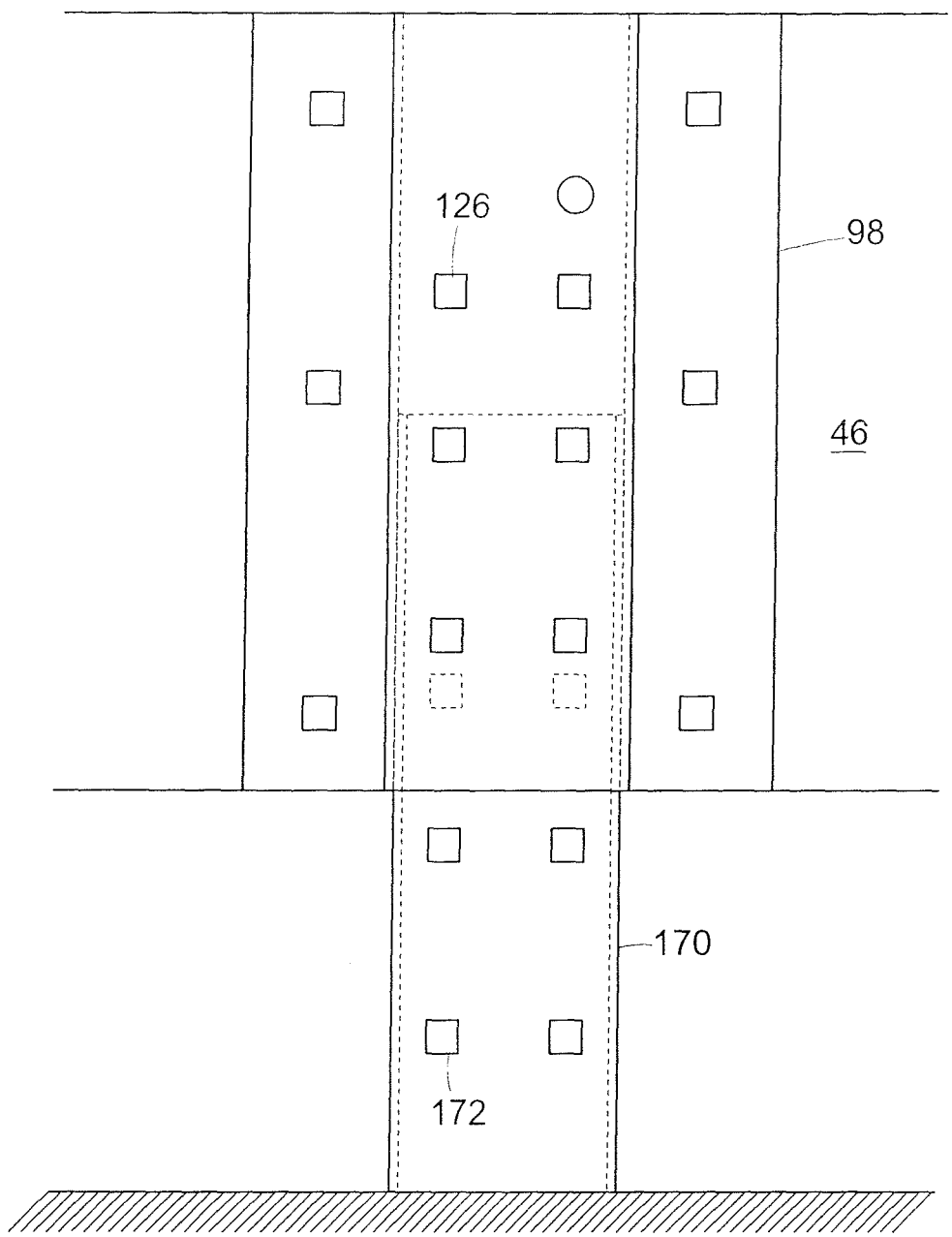
FIG. 14 is an elevation view of a portion of a lower frame detailing a support member for mounting the curb upon a base structure.

The lower housings 98 also provide a housing for the means by which the curb is mounted to the underlying structure, such as a roof. As illustrated in FIG. 14, the lower frame is mounted to the underlying supporting structure by series of legs in the form of support tubes 170. Each of the tubes 170 is dimensioned to be received in the pocket formed between the U-shaped central portion 116 (see FIG. 12) of lower housing 98 and the vertical wall portion 46 of the panel to which the lower housing is mounted.

The lower housing is dimensioned to preferably form a pocket sized to provide a snug fit for a tube 3 inches wide by 1.5 inch deep, formed of 11 gauge stock. The tube had square bores 172, alignable with the bores 126 in the lower housing to allow the tube to be affixed to the lower housing by mounting bolts. The tube may be adjusted vertically as appropriate by aligning selected bores, and its overall length can be shortened as may be needed from an initial provided length by cutting. The length of a tube is chosen in conjunction with the length of the other tubes to mount and orient the curb horizontally, irrespective of the contour or pitch of the structure to which it is mounted. The tubes 170 are typically welded at their lower ends to beams or other substantial constructional elements of the supporting structure.

To provide a weather-resistant seal between the curb and the surface to which it is mounted, the lower frame panels are adapted to receive and support a series of nailer blocks 52, as seen in FIGS. 1 and 5. These nailer blocks are mounted within the upper portions of the lower frame panels, and screws 54. The nailer blocks may be cut to length and positioned as required by the assembled size of the curb, and provide a surface to which roofing materials, such as flashing and the like, may be applied to create a water-resistant interface between the curb and the roof or other mounting surface.

Conventional curbs are ill-equipped to resist seismic shock and developed moments. Accordingly, and as illustrated in FIGS. 16A and 16B, the present invention provides for seismic mounts to provide a rigid and solid connection between the equipment and the curb.

Figure 16A:
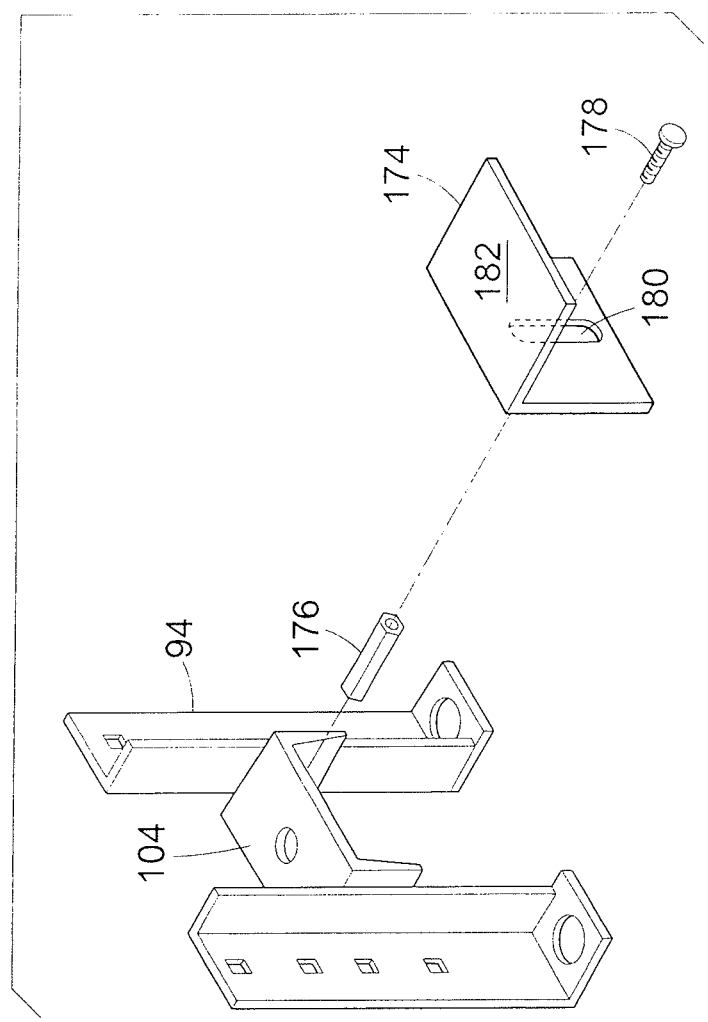
FIG. 16A is a perspective view of an upper housing of FIG. 11, illustrating the mounting of a seismic bracket thereto.

FIG. 16A illustrates a seismic bracket 174, of a right angle construction, to be mounted to an upper housing 94. A threaded bushing or nut 176 is welded to horizontal plate 104, allowing the bracket to be affixed to the housing by bolt 178. Slot 180 allows vertical positioning of the bracket on the housing such that its upper surface can be placed in contact with a lower surface of the equipment mounted on the curb. The bracket may be joined to the equipment by a screw or the like.

Figure 16B:
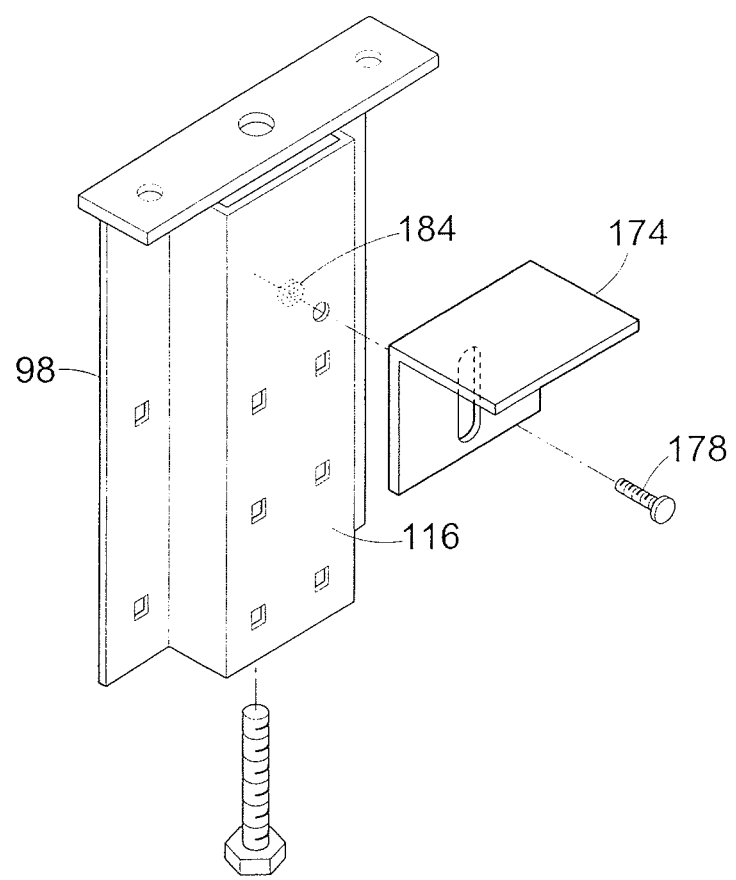
FIG. 16B is a perspective view of a lower housing of FIG. 11, illustrating the mounting of a seismic bracket thereto.

FIG. 16B illustrates the mounting of a similar bracket 174 to a lower housing for engagement with supported equipment when an upper frame 14 is not employed. Nut 184 may be welded to the upper inner surface of central portion 116, which is provided with an aligned bore 184' as seen in FIG. 11 to allow the bracket to be affixed to the housing by bolt 178. Slot 180 again allows vertical positioning of the bracket on the housing such that its upper surface can be placed in contact with a lower surface of the mounted equipment.

Respective panel elements for the sides and ends of both the upper and lower frames may be easily interconnected on-site and length-adjusted to accommodate a wide range of equipment footprints. The sides and ends are similarly easily joined together to provide rigid frames of the appropriate dimensions, the frames being interconnected by the mount assemblies. The upper frame may be dispensed with if a non-resilient mount is desired. The support tubes are oriented and fastened to the lower mounts to properly align the curb and allow it to be firmly affixed to the supporting structure. Interior supports for ductwork associated with the equipment to be mounted can likewise be positioned as required. The overall modular approach permits adaptability not possible with conventional curb constructions.

Those skilled in the art will recognize that modifications and variations to the specific embodiment detailed herein may be achieved without departure from the sprint of the invention, which is to be further assessed by reference to the annexed claims.

We claim:

1. An adjustable equipment curb, comprising:
upper and lower frames, each having opposed first and second length-adjustable frame sides and opposed length-adjustable first and second ends, each comprised of a plurality of interconnecting members and interconnected by corner brackets to form a rigid frame;

the sides and ends of the upper frame having upper surfaces to support and mount a piece of equipment thereon and the lower frame having means for mounting the curb to a support surface;

means associated with each of the upper and lower frame sides and ends for rigidly joining the interconnecting members to maintain the sides and ends at chosen lengths; and means for supporting the upper frame upon the lower frame comprising an H shaped upper housing mounted to the upper frame, the upper housing comprising a pair of vertical legs affixed to the upper frame and an intermediate cross member therebetween for engaging with an upper end of a biasing system, the upper housing being connected to a lower housing by means for providing a limited amount of vertical travel of the upper housing with respect to the lower housing.

2. The curb of claim 1 wherein the members of the frames sides comprise first and second end panels slidably interconnected to a central panel.

3. The curb of claim 2 wherein the end and central panels of the upper and lower frame sides are c-shape in cross-section with vertical returns.

4. The curb of claim 2 wherein one of the end panels or the central panel is perforated with circular holes, the other of the end panels or central panel being perforated with oval holes, the circular and oval holes being positioned in the panels to be able to overlie each other when the panels are slidably interconnected.

5. The curb of claim 2 wherein the upper housing is mounted to each central panel of an upper frame side and the lower housing is mounted to the central panel of each lower frame side.

6. The curb of claim 1 wherein the members of the frames ends comprise first and second panels slidably interconnected.

7. The curb of claim 1 wherein the members of the upper frame ends further comprise a third panel slidably interconnecting the first and second panels.

8. The curb of claim 7 wherein the panels of the frame ends are C-shaped in cross-section with vertical returns.

9. The curb of claim 1 wherein the corner brackets comprise angle members to connect the upper and lower frame sides to the respective frame ends.

10. The curb of claim 1 wherein the upper frame has at least one panel with a vertical wall, the upper housing being mounted against the vertical wall.

11. The curb of claim 1 wherein the lower frame has at least one panel with a vertical wall and right angle top and bottom walls, the upper frame supporting means further comprising at least one mount assembly having the lower housing mounted against the vertical wall of a lower frame panel and the upper housing mounted to the upper frame.

12. The curb of claim 11 wherein the at least one mount assembly comprising a plurality of mount assemblies located along the sides of the curb.

13. The curb of claim 11 wherein the upper frame supporting means comprise three mount assemblies mounted along each side of the curb, the mounting assemblies each comprising a lower housing mounted to each of the lower frame sides and a corresponding upper housing mounted to the upper frame side.

14. The curb of claim 13 wherein at least one lower housing is mounted to an end of a lower frame side and includes a corner bracket to interconnect the lower frame side to an adjacent lower frame end.

15. The curb of claim 13 wherein the upper frame supporting means further includes a spring system between the upper and lower housings.

16. The curb of claim 15 wherein the spring system includes spring tension adjustment means for adjusting spring tension.

* * * * *